United States Patent
Arpin

(10) Patent No.: US 8,557,910 B2
(45) Date of Patent: Oct. 15, 2013

(54) REINFORCED PCT COMPOSITIONS

(76) Inventor: Thierry Arpin, Annemasse (FR)

( * ) Notice: Subject to any disclaimer, the term of this patent is extended or adjusted under 35 U.S.C. 154(b) by 591 days.

(21) Appl. No.: 11/985,712

(22) Filed: Nov. 16, 2007

(65) Prior Publication Data

US 2008/0153954 A1   Jun. 26, 2008

Related U.S. Application Data

(60) Provisional application No. 60/875,265, filed on Dec. 15, 2006.

(51) Int. Cl.
| C08G 18/42 | (2006.01) |
| C08K 290/06 | (2006.01) |
| C08K 3/40 | (2006.01) |

(52) U.S. Cl.
USPC .............. 524/500; 524/80; 524/323; 524/411

(58) Field of Classification Search
USPC .............. 251/305; 524/411, 412, 539, 80–81, 524/500, 494, 323, 282; 525/444
See application file for complete search history.

(56) References Cited

U.S. PATENT DOCUMENTS

| 4,837,254 A * | 6/1989 | Branscome .................. 523/455 |
| 5,242,967 A * | 9/1993 | Minnick ....................... 524/411 |
| 6,512,027 B2 | 1/2003 | Kanai et al. |
| 2004/0104373 A1* | 6/2004 | Dutmer et al. ................ 251/305 |

FOREIGN PATENT DOCUMENTS

| EP | 0 196 194 B1 | 10/1986 |
| EP | 0 246 620 B1 | 11/1987 |
| EP | 0 190 011 B1 | 4/1989 |
| EP | 0 400 935 B1 | 12/1990 |
| EP | 400935 A2 * | 12/1990 |
| EP | 712 899 B1 | 6/1999 |
| EP | 1 452 567 A1 | 9/2004 |
| WO | WO91/05820 | 5/1991 |
| WO | WO2005/026258 | 3/2005 |

OTHER PUBLICATIONS

"Irganox" Ciba Specialty Chemical, Inc., pp. 1-2, 2004.*
Japanese Abstract No. JP 03263457, (Nov. 22, 1991).
Japanese Abstract No. JP 03220260, (Sep. 27, 1991).
Japanese Abstract No. 06065481, (Mar. 8, 1994).
Japanese Abstract No. 06016914, (Jan. 25, 1994).

* cited by examiner

Primary Examiner — Hannah Pak
(74) Attorney, Agent, or Firm — Dority & Manning, PA

(57) ABSTRACT

The invention relates to polymer compositions comprising PCT (poly((cyclohexylene-dimethylene)terephthalate)) polymer and a fibrous glass filler having a non-circular cross-sectional aspect ratio of greater than at or about 4.

21 Claims, No Drawings

REINFORCED PCT COMPOSITIONS

CROSS REFERENCE TO RELATED APPLICATIONS

This application claims the benefit of priority to U.S. Provisional Application No. 60/875,265, filed Dec. 15, 2006.

FIELD OF INVENTION

The present invention relates to the field of mineral reinforced thermoplastic polymers, in particular, poly((cyclohexylene-dimethylene) terephthalate).

BACKGROUND OF THE INVENTION

High temperature resins based on poly((cyclohexylene-dimethylene) terephthalate) possess desirable chemical resistance, processability and heat resistance. This makes them particularly well suited for demanding high performance automotive and electrical/electronics applications.

The ability of a substance to retain its shape when subjected to changes in temperature, which is defined as the dimensional stability, is a crucial parameter for many applications. Dimensional stability may be quantified by, for example, the coefficient of linear thermal expansion (CLTE).

Also important in parts made of thermoplastics are mechanical properties such as for example a) the stiffness of the material which is quantified by the modulus of elasticity (E-modulus) corresponding to a proportional constant between stress and strain, the stress at yield and the stress at break, as well as b) the impact strength which is quantified by charpy (un)notched impact.

A good balance between mechanical properties and dimensional stability is particularly important for precision molded articles. Most polymers can be mixed with fillers to provide an almost unlimited range of compositions to fit a wide range of engineering applications. In an attempt to improve mechanical properties, it has been the conventional practice to add various reinforcements to the resin, like for example glass fibers, glass flakes, carbon fiber, mica, wollastonite, talc, calcium carbonate. Glass fibers are known to offer excellent dispersion in high temperature thermoplastic polymers and lead to good mechanical properties under standard conditions. According to the current need of developing highly efficient reinforced polymer for engineering applications demanding improved dimensional stability and good mechanical properties, non-fibrous glass flakes are also used due to the benefits that are: a) a reduced warpage, b) an improved dimensional stability, c) a reduced anisotropy of shrinkage and mechanical properties, and d) high impact properties compared to mineral agents. Examples of glass fiber or glass flakes reinforced poly(alkylene terephthalate) resin compositions be found in and EP 1452567, WO 2005/026258, JP 06065481 or JP 06016914 for poly(cyclohexylene-dimethylene)terephthalate compositions and in U.S. Pat. No. 6,512,027, U.S. Pat. No. 6,180,251 and EP 712899 for poly(butylene terephthalate) (PBT) compositions.

Unfortunately, at elevated temperature, thermoplastics filled with conventional glass fiber filler or glass flakes either exhibit reduced dimensional stability and/or inferior mechanical properties such as stiffness, impact resistance and/or aging resistance.

There is a need for a high performance polyester polymer, like for example poly((cyclohexylene-dimethylene)terephthalate) composition having improved dimensional stability at high temperature and retaining a good degree of mechanical properties.

SUMMARY OF THE INVENTION

The inventors have surprisingly found that the use of particular glass fillers in poly((cyclohexylene-dimethylene) terephthalate) (PCT) resin composition leads to resins having increased dimensional stability while maintaining good mechanical properties.

In a first aspect, the invention provides a polymer composition comprising:
a) PCT poly((cyclohexylene-dimethylene) terephthalate) polymer; and
b) a fibrous glass filler having a non-circular cross-sectional aspect ratio of greater than at or about 4.

In a second aspect, the invention provides an article made of the polymer composition of the invention.

DETAILED DESCRIPTION OF THE INVENTION

The polymer composition of the present invention comprises a high temperature thermoplastic polymer and mineral filler.

For the purposes of the description, high temperature means temperatures at or in excess of 100° C., preferably, at or in excess of 150° C. and more preferably at or in excess of 180° C.

The term thermoplastic is related to the fact that the polymer can be repeatedly, in opposition to thermosets, melted and solidified by heating and cooling without involving any important changes in properties; typical examples of thermoplastics are acrylics, polyamides, polyphthalamides, polyimides, polyethylene, polystyrene, or polyesters. The thermoplastic used in the present invention, i.e. PCT poly ((cyclohexylene-dimethylene) terephthalate), has a high melting point (i.e. about 285° C.) and is characterized by high mechanical properties combined with heat and chemical resistance which makes it suitable for high performance applications demanding dimensional and mechanical stability over extended high temperature ranges. Such polymer compositions are particularly suitable for, among other applications, the manufacture of electrical/electronic and automotive components and for use in articles made from these compositions.

Poly((cyclohexylene-dimethylene) terephthalate) is a polyester formed from a diol and a dicarboxylic acid. By "poly(1,4-cyclohexanedimethanol terephthalate)" (PCT) is meant a polyester formed from a diol and a dicarboxylic acid. At least about 80 mole percent, more preferably at least about 90 mole percent, and especially preferably all of the diol repeat units are derived from 1,4-cyclohexanedimethanol and are of formula (I).

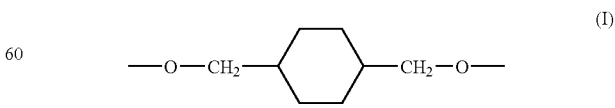

At least about 80 mole percent, more preferably at least about 90 mole percent, and especially preferably all of the dicarboxylic acid repeat units are derived from terephthalic acid and are of formula (II).

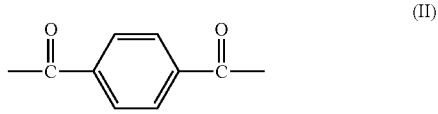

(II)

The PCT may also contain up to 10 mole percent (based on the total amount of (I) and (II) present) of one or more repeat unit derived from hydroxycarboxylic acids, although it is preferred that no such repeat unit be present. One particular preferred PCT contains (I) as the diol repeat unit, (II) is 95 mole percent of dicarboxylic acid repeat unit and the other 5 mole percent of the dicarboxylic repeat unit is derived from isophthalic acid, and no repeat units derived from hydroxycarboxylic acid are present. The PCT is present in an amount from about 30 to about 95 wt-% of the polymer composition according to the present invention, or preferably from about 40 to about 85 wt-%, the weight percentage being based on the total weight of the polymer composition.

With the aim of increasing the strength of a polymer material, a new kind of glass fiber has been described in EP 0190011 and in EP 196194. These fibrous glass fillers are characterized by a non-circular cross section. The non-circular cross section have the shape of, for example, an oval, elliptic, cocoon or rectangular.

These kinds of non-circular cross-sectional fibrous glass filler are described and differentiated from conventional fibrous glass fillers by their cross-sectional aspect ratio and are differentiated from conventional glass flakes by their fibrous nature. The term "fibrous" in the context of the invention means composed of one or multiple filaments of glass. The "cross-sectional aspect ratio" is measured by cutting the fibrous glass filler perpendicularly to its longitudinal axis and measuring the ratio between the major axis of the cross section (i.e. its longest linear dimension) and the minor axis of the cross section (i.e. its shortest linear dimension perpendicular to the major axis). For comparison, circular cross-section fibers that are typically employed have a cross-sectional aspect ratio of about 1. Glass flakes fillers are differentiated from non-circular cross-sectional glass filler by their non-fibrous nature.

While not wishing to be bound by theory, it is believed that the use of fibrous non-circular cross-sectional glass filler enables an increase in bond strength between the filler and the polymer material. Due to their specific surface areas which is greater than those of conventional fibrous circular cross-sectional glass fillers, such fibrous non-circular cross-sectional glass fillers produce under standard conditions an improved reinforcing effect with significant improvement in a) impact resistance, b) warpage stability and c) fluidity during injection molding compared to conventional fibrous glass fillers having a circular cross-sectional shape. The use of fibrous glass filler having a non-circular cross-sectional shape are described in EP 400935 EP 0246620, JP 03263457 or JP 03220260 for poly(butylene) terephthalate compositions. Examples of fibrous glass fillers having a cross-sectional aspect ratio of greater than at or about 4 are rectangular or flat-shaped ones. Preferred reinforcing agents used in the PCT composition of the present invention are fibrous glass fillers having a non-circular cross-sectional aspect ratio of greater than at or about 4. Particularly preferred are fibrous glass fillers having a non-circular cross-sectional aspect ratio of at or about 4. More particularly preferably, the geometry of fibrous non-circular cross-sectional glass filler corresponds to a macroscopic rectangular box with dimensions of a) a width range of at or about 2 to 3 mm, b) a length range of at or about 3 to 4 mm and c) a thickness range of at or about 0.5 to 1 mm. Preferably, the amount of the glass filler is from about 5 to about 70 wt-%, or more preferably from about 15 to about 60 wt-% of the total polymer composition. When the amount of fibrous non-circular cross-sectional glass filler is less than 5 wt-%, little beneficial effect can be obtained and, on the other hand, when it is higher than 70 wt-%, the resin will be difficult to extrude.

The compositions may optionally contain up to about 40 wt-%, or more preferably up to about 20 wt-% of other thermoplastic polymers, such as another thermoplastic polyester (such as poly(ethylene terephthalate) (PET), poly(propylene terephthalate) (PPT), poly(butylene terephthalate) (PBT), poly(naphthalene terephthalate) (PEN), and the like), liquid crystalline polyesters, and the like, the weight percentage being based on the total weight of PCT and other thermoplastic polymer.

Optionally, the polymer compositions of the invention may include additives which are generally comprised in thermoplastic resin compositions.

The compositions may optionally contain one or more polymeric tougheners. The toughener will typically be an elastomer having a relatively low melting point, generally <200° C., preferably <150° C. and that has attached to it functional groups that can react with the PCT (and optionally other polymers present). Since PCT usually has carboxyl and hydroxyl groups present, these functional groups usually can react with carboxyl and/or hydroxyl groups. Examples of such functional groups include epoxy, carboxylic anhydride, hydroxyl (alcohol), carboxyl, and isocyanate. Preferred functional groups are epoxy, and carboxylic anhydride, and epoxy is especially preferred. Such functional groups are usually "attached" to the polymeric tougheners by grafting small molecules onto an already existing polymer or by copolymerizing a monomer containing the desired functional group when the polymeric tougheners molecules are made by copolymerization. As an example of grafting, maleic anhydride may be grafted onto a hydrocarbon rubber using free radical grafting techniques. The resulting grafted polymer has carboxylic anhydride and/or carboxyl groups attached to it. An example of a polymeric tougheners wherein the functional groups are copolymerized into the polymer is a copolymer of ethylene and a (meth)acrylate monomer containing the appropriate functional group. By (meth)acrylate herein is meant the compound may be either an acrylate, a methacrylate, or a mixture of the two. Useful (meth)acrylate functional compounds include (meth)acrylic acid, 2-hydroxyethyl (meth)acrylate, glycidyl (meth)acrylate, and 2-isocyanatoethyl (meth)acrylate. In addition to ethylene and a functional (meth)acrylate monomer, other monomers may be copolymerized into such a polymer, such as vinyl acetate, unfunctionalized (meth)acrylate esters such as ethyl (meth)acrylate, n-butyl (meth)acrylate, and cyclohexyl (meth)acrylate. Preferred toughening agents include those listed in U.S. Pat. No. 4,753,980, which is hereby included by reference. Especially preferred tougheners are copolymers of ethylene, ethyl acrylate or n-butyl acrylate, and glycidyl methacrylate, such as EBAGMA and ethylene/methyl acrylate copolymers.

It is preferred that the polymeric toughener, if used, contain about 0.5 to about 20 wt-% of repeat units derived from monomers containing functional groups, preferably about 1.0 to about 10 wt-%, more preferably about 7 to about 13 wt-% of repeat units derived from monomers containing functional groups. There may be more than one type of repeat unit derived from functionalized monomer present in the polymeric toughener. It has been found that toughness of the composition is increased by increasing the amount of polymeric toughener and/or the amount of functional groups. However, these amounts should preferably not be increased to the point that the composition may crosslink, especially before the final part shape is attained.

The polymeric toughener may also be thermoplastic acrylic polymers that are not copolymers of ethylene. The thermoplastic acrylic polymers are made by polymerizing acrylic acid, acrylate esters (such as methyl acrylate, n-propyl acrylate, isopropyl acrylate, n-butyl acrylate, n-hexyl acrylate, and n-octyl acrylate), methacrylic acid, and methacrylate esters (such as methyl methacrylate, n-propyl methacrylate, isopropyl methacrylate, n-butyl methacrylate (BA), isobutyl methacrylate, n-amyl methacrylate, n-octyl methacrylate, glycidyl methacrylate (GMA) and the like). Copolymers derived from two or more of the forgoing types of monomers may also be used, as well as copolymers made by polymerizing one or more of the forgoing types of monomers with styrene, acryonitrile, butadiene, isoprene, and the like. Part or all of the components in these copolymers should preferably have a glass transition temperature of not higher than 0° C. Preferred monomers for the preparation of a thermoplastic acrylic polymer toughening agent are methyl acrylate, n-propyl acrylate, isopropyl acrylate, n-butyl acrylate, n-hexyl acrylate, and n-octyl acrylate.

It is preferred that a thermoplastic acrylic polymer toughening agent have a core-shell structure. The core-shell structure is one in which the core portion preferably has a glass transition temperature of 0° C. or less, while the shell portion is preferably has a glass transition temperature higher than that of the core portion. The core portion may be grafted with silicone. The shell section may be grafted with a low surface energy substrate such as silicone, fluorine, and the like. An acrylic polymer with a core-shell structure that has low surface energy substrates grafted to the surface will aggregate with itself during or after mixing with the thermoplastic polyester and other components of the composition of the invention and can be easily uniformly dispersed in the composition.

When present, the tougheners preferably comprise about 0.5 to about 15 wt-%, or more preferably about 1 to about 5 wt-%, the weight percentage being based on the total weight of the polymer composition.

The compositions may optionally contain one or more oxidative stabilizers. Examples of suitable oxidative stabilizers include phosphite and hypophosphite stabilizers, hindered phenol stabilizers, hindered amine stabilizers, thioesters, and phenolic based anti-oxidants that hinder thermally induced oxidation of polymers where high temperature applications are used. When present, the oxidative stabilizers comprise about 0.1 to about 3 wt-%, or preferably about 0.1 to about 1 wt-%, or more preferably about 0.1 to about 0.7 wt-%, the weight percentage being based on the total weight of the composition.

A partial amount of the fibrous non-circular cross-sectional glass fillers can be replaced by others reinforcing agents such as fibrous reinforcing agents having a circular cross section or glass flakes or particulate reinforcing agents. Preferably, from about 1 wt-% of the fibrous non-circular cross-sectional glass fillers to about 50 wt-% can be replaced by the others reinforcing agents, where this range corresponds to from about 0.5 to about 35 wt-% of the polymer composition, the weight percentage being based on the total weight of the composition.

The composition used in the present invention may further include modifiers and other ingredients, including, without limitation, lubricants, UV light stabilizers, antistatic agents, coloring agents, flame retardants, nucleating agents, crystallization promoting agents and other processing aids known in the polymer compounding art.

The compositions are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

In another aspect, the present invention relates to an article made with the polymer composition of the invention. The article according to the present invention may be produced by extrusion, shaping or by any molding process know to one of ordinary skill in the art, comprising for example injection molding, compression molding or blow molding. Preferably, the article is molded by injection process.

In a preferred embodiment, the molded article is a throttle body. In a fuel injection engine, the throttle body consists in the part of the air intake system that controls the amount of air flowing into the engine, in response to driver input and warms the air going into the engine. When the car is warmed up, a heat of nearly 200° C. is transmitted through it, which requires that this throttle body has to be made in a material exhibiting high dimensional stability and good degree of mechanical properties under such high temperature.

The invention will be further described in the Examples below.

EXAMPLES

The following materials were used for preparing the polymer composition according to the present invention and comparative examples:

Poly((cyclohexylene-dimethylene) terephthalate) (PCT): commercially available from Eastman Chemical Company (product number: PCT 13787).

Fibrous non-circular cross-sectional glass fillers (for composition according to the present invention E1): non-circular cross-sectional shape having the geometry of a rectangular box with dimensions of 3-4×2-3×0.5-1 mm (length×width× thickness) and having a fibrous nature and a cross-sectional aspect ratio of about 4. These fibrous non-circular cross-sectional glass fillers are commercially available from Nitto Boseki Co., Ltd (product number: CSG3PA830).

Fibrous glass fillers (for comparative composition C1): characterized by a nominal fiber diameter of 10 μm and a standard cut length of 4.5 mm and having a fibrous nature and a cross-sectional aspect ratio of 1. These fibrous circular cross-sectional glass fillers are commercially available from PPG Industries Inc., Pittsburgh, Pa. under the trademark Chop Vantage® 3540.

Non-fibrous glass flakes fillers (for comparative composition C2): characterized by a nominal particle size of 160 μm and a thickness of approximately 5 μm and having a non-fibrous nature. These non-fibrous glass flakes fillers are commercially available from NGF under the trademark Microglas® REF-160.

The formulation of the PCT composition according to the present invention and comparative ones are shown in Table 1.

TABLE 1

PCT compositions according to the present invention (E1) and comparative ones (C1 and C2).
Formulation/wt-%

|  | Non-circular cross-sectional fibrous glass fillers (cross sectional aspect ratio of 4) E1 | Fibrous glass fillers (aspect ratio of 1) C1 | Fibrous glass fillers and non-fibrous glass flakes C2 |
|---|---|---|---|
| PCT | 48.4 | 48.4 | 47.4 |
| glass filler | 40 | 40 | 27 (fibrous filler) and 14 (flakes filler) |
| Crastin ®613NC10 | 4 | 4 | 4 |
| Epon ® 1009 | 1.20 | 1.20 | 1.20 |
| Steamic ® OOS | 0.5 | 0.5 | 0.5 |
| Licowax ® PED521 | 0.6 | 0.6 | 0.6 |
| Araldite ® ECN1299 | 2.3 | 2.3 | 2.3 |
| Irganox ® 1010 | 0.25 | 0.25 | 0.25 |
| Ultranox ® 626A | 0.25 | 0.25 | 0.25 |
| EMAC ® SP2260 | 2 | 2 | 2 |
| RYN RE5334 BKC | 0.5 | 0.5 | 0.5 |

Ingredient quantities are given in wt-% on the basis of the total weight of the composition.
PCT is a poly((cyclohexylene-dimethylene) terephthalate)supplied by Eastman Chemical Company.
Crastin ® 6136NC10 is a poly(butylene terephatalate) (PBT), works as a viscosity reducer in these compositions, supplied by E. I. du Pont de Nemours and Company, Wilmington, Delaware.
Epon ® 1009 is an epoxy resin supplied by Resolution Performance Products, Houston, Tex. 77210.
Steamic OOS ™ is a nucleant supplied by Talc de Luzenac.
Licowax ® PED521 is an oxidized polyethylene wax lubricant supplied by from Clariant Corp. Charlotte, N.C.
Araldite ® ECN1299 is an epoxy cresol novolac resin supplied by Ciba Specialty Chemicals, Tarrytown, N.Y. 10591 USA.
Irganox ® 1010 is a phenolic based antioxidant supplied by Ciba Specialty Chemicals, Tarrytown, N.Y. 10591, USA.
Ultranox ® 626A is a diphosphite based antioxidant supplied by G. E. Specialty Chemicals, Parkersburg, WV.
EMAC ® SP2260 is an ethylene methyl-acrylate copolymer, toughener supplied by Eastman Chemical Co., Kingsport, TN.
RYN RE5334 BKC: is a black color masterbatch based on poly(ethylene terephthalate) supplied by E. I. du Pont de Nemours and Company, Wilmington, Delaware.

The compositions of Examples were prepared by melt blending the ingredients shown in Table 1 in a 40 mm twin screw kneader operating at about 300° C. using a screw speed of about 300 rpm, a melt temperature displayed of about 310° C. and a melt temperature measured by hand of about 340° C. Upon exiting the extruder, the compositions were cooled and pelletized.

Dimensional Stability and Mechanical Properties of the Molded Samples:

a) Dimensional stability was measured according to ISO 11359 for CLTE measurements (−40° C. to 200° C.) in the cross-flow direction. Results are given in Table 2. Measurements were done on injection molded plates (melt temperature=300° C.; mold temperature=110° C. and a hold pressure of 80 MPa) with dimensions of 60×60×2 mm according to ISO 294.

b) Mechanical tensile properties, i.e. E-modulus, stress at yield and stress at break, were measured according to ISO 527. Measurements were done on injection molded ISO tensile bar R60 samples (melt temperature=300° C.; mold temperature=110° C. and a hold pressure of 90 MPa) with a thickness of the test specimen of 4 mm and a width of 10 mm according to ISO 527. The test specimens were samples aged air ovens according to the heat aging procedure ISO 175 (air oven heat ageing). Results are given in Table 3.

c) Charpy unnotched impact strength was measured according to ISO 179/1 eU. Measurements were done on injection molded ISO bar samples (melt temperature=300° C.; mold temperature=110° C. and a hold pressure of 90 MPa) with a thickness of 4 mm and a width of 10 mm. The test specimens were aged samples into air ovens to the heat aging procedure according to ISO 175 (air oven heat ageing). Results are given in Table 3.

TABLE 2

Dimensional stability of the sample according to the present invention and comparative ones.

|  | E1 | C1 | C2 |
|---|---|---|---|
| CLTE in cross-flow direction |  |  |  |
| −40° C. to 23° C./μm m$^{-1}$ ° C.$^{-1}$ | 41.17 | 53.12 | 43.72 |
| 23° C. to 55° C./μm m$^{-1}$ ° C.$^{-1}$ | 37.13 | 58.34 | 45.64 |
| 55° C. to 200° C./μm m$^{-1}$ ° C.$^{-1}$ | 46.89 | 83.99 | 75.64 |
| Dimension change |  |  |  |
| From −40° C. to 200° C./μm | 50.61 | 83.05 | 72.25 |
| From −40° C. to 200° C./% | 1.06 | 1.74 | 1.52 |

TABLE 3

Mechanical properties of the sample according to the present invention and comparative ones day after molding and after heat aging at 150° C. and 180° C. for 500 hours.

|  |  | example | | |
|---|---|---|---|---|
|  |  | E1 | C1 | C2 |
| Mechanical tensile properties | E-modulus at 23° C./MPa |  |  |  |
|  | DAM | 11601 | 12120 | 10635 |
|  | heat aging at 150° C. for 500 hours | 11802 | 12086 | 10863 |
|  | heat aging at 180° C. for 500 hours | 11809 | 12177 | 10807 |
|  | Stress at yield at 23° C./MPa |  |  |  |
|  | DAM | 137 | 147 | 118 |
|  | heat aging at 150° C. for 500 hours | 158 | 169 | 138 |
|  | heat aging at 180° C. for 500 hours | 137 | 145 | 115 |
|  | Stress at break at 23° C./MPa |  |  |  |
|  | DAM | 137 | 147 | 117 |
|  | heat aging at 150° C. for 500 hours | 157 | 169 | 138 |
|  | heat aging at 180° C. for 500 hours | 138 | 143 | 107 |
| Impact strength | Charpy Unnotched at 23° C./ kJ · m$^{-2}$ |  |  |  |
|  | DAM | 55.0 | 65.0 | 50.0 |
|  | heat aging at 150° C. for 500 hours | 50.6 | 55.2 | 45.5 |
|  | heat aging at 180° C. for 500 hours | 27.7 | 32.2 | 21.7 |

DAM = dried as moulded

The ability of material based molded sample to maintain its original shape and dimensions upon change in temperature was quantified with the coefficient of linear thermal expansion (CLTE) and the dimension change in the cross-flow direction. It consisted of measuring the expansion of the sample during temperature fluctuations from low temperature to the highest temperature of interest for the purposed applications. High values of CLTE mean a high expansion of the test piece as a function of temperature, and are undesirable.

As shown in Table 2, the composition according to the present invention (E1) which comprised fibrous non-circular cross-sectional glass filler having a cross-sectional aspect ratio of about 4 as PCT reinforcing agent exhibited significantly lower CLTE values in the temperature range of −40° C. to 200° C. in comparison with the samples comprising conventional glass fibers having a cross-sectional aspect ratio of 1 (C1) or non-fibrous glass flakes filler (C2) reinforced PCT.

With the aim of assessing the mechanical properties of the PCT composition of the present invention and comparative ones upon high temperature stress, all the compositions were heat aged at 150° C. and 180° C. for about 500 hours. Mechanical tensile properties were obtained by measuring the load carried by the sample of interest upon elongation. Higher values of mechanical tensile properties (E-modulus, stress at yield and stress at break) and of charpy impact strength mean better mechanical properties.

The impact strength test is a method for evaluating the relative toughness of materials. It is defined as the energy per unit area required to break a test specimen by the impact of a heavy pendulum hammer. The energy lost by the pendulum is equated with the energy absorbed by the test specimen: tough materials absorb a lot of energy when fractured (meaning high values of charpy (unnotched) whereas brittle materials absorb very little energy).

As said before, a balance between high dimensional stability and good mechanical properties is desirable for high performance and for high temperature demanding applications. While fibrous circular cross-sectional glass filler having a cross-sectional aspect ratio of 1 (C1) reinforced PCT composition led to excellent mechanical properties (see Table 3), as previously pointed out (see Table 2), dimensional stability against high temperature was lower in comparison with the PCT composition of our invention. In contrast, when non-fibrous glass flakes filler were used, a significant decrease of the mechanical properties of the PCT polymer compositions resulted as shown in Table 3 by significantly lower mechanical tensile properties and impact strength in comparison with fibrous glass filler having a cross-sectional aspect ratio of 1 (C1). Surprisingly, the use of fibrous glass filler having a non-circular cross-sectional aspect ratio of greater than at or about 4 (E1) led to a recovery of the mechanical properties in comparison with conventional fibrous glass fibers filler having a cross-sectional aspect ratio of 1(C1) as well as having the best dimensional stability of the comparative samples.

In addition to have improved dimensional stability upon high temperature, the PCT composition of the present invention exhibits good mechanical properties (mechanical tensile properties and impact strength) after heat aging at 150° C. and 180° C.

The invention claimed is:

1. A polymer composition consisting of:
   a) a PCT (poly(cyclohexylene-dimethylene)terephthalate) polymer in an amount from about 30 to about 95 wt % of the polymer composition,
   b) a fibrous glass filler having a non-circular cross-sectional aspect ratio of greater than at or about 4 in an amount from about 5 to about 70 wt % of the polymer composition,
   c) up to about 40 wt % of other thermoplastic polymers selected from the group consisting of poly(ethylene terephthalate), poly(propylene terephthalate), poly(butylene terephthalate), and poly(naphthalene terephthalate), and
   d) optionally, one or more additives selected from the group consisting of a polymeric toughener, one or more oxidative stabilizers, a lubricant, a UV light stabilizer, an antistatic agent, a coloring agent, a nucleating agent, and one or more reinforcing agents.

2. The polymer composition according to claim 1, consisting from about 40 to about 85 wt % of the PCT polymer.

3. The polymer composition according to claim 1, consisting from about 15 to about 60 wt % of the fibrous glass filler.

4. The polymer composition according to claim 1, wherein the fibrous glass filler has a cross-sectional aspect ratio of at or about 4.

5. The polymer composition according to claim 1, wherein the fibrous glass filler has a geometry of a rectangular box with dimensions of:
   i) width range of at or about 2 to 3 mm,
   ii) length range of at or about 3 to 4 mm,
   iii) thickness of at or about 0.5 to 1 mm.

6. The polymer composition according to claim 1 comprising up to about 40 wt-% of component c).

7. The polymer composition according to claim 1 wherein the additive is the polymeric toughener.

8. The polymer composition according to claim 1 consisting about 0.1 to about 3 wt % of the one or more oxidative stabilizer.

9. The polymer composition according to claim 1, wherein the one or more reinforcing agents are selected from fibrous reinforcing agents having a circular cross section or glass flakes or particulate reinforcing agents.

10. The polymer composition according to claim 9 consisting up to about 35 wt % of the one or more additional reinforcing agents.

11. A method of manufacturing the polymer composition according to claim 1, comprising the step of mixing PCT polymer and the fibrous glass filler.

12. A molded article formed from the polymer composition according to claim 1.

13. The molded article according to claim 12, wherein the molded article is an injection molded article.

14. The molded article according to claim 12, wherein the molded article is a throttle body.

15. The polymer composition according to claim 1, wherein the PCT (poly(cyclohexylene-dimethylene)terephthalate) has a melting point of about 285° C.

16. The polymer composition according to claim 1, wherein the PCT (poly(cyclohexylene-dimethylene)terephthalate) includes repeat units, and the PCT (poly(cyclohexylene-dimethylene)terephthalate) is formed from a diol and a dicarboxylic acid, at least about 80 mole percent of the diol repeat units being derived from 1,4-cyclohexanedimethanol, and at least about 80 mole percent of the dicarboxylic acid repeat units being derived from terephthalic acid.

17. The polymer composition according to claim 16, wherein 95 mole percent of the dicarboxylic acid repeat units are derived from terephthalic acid having the formula:

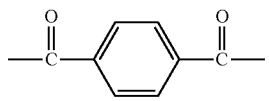

and 5 mole percent of the dicarboxylic acid repeat units are derived from isophthalic acid.

18. The polymer composition according to claim 7, wherein the polymeric toughener has a melting point less than 200° C.

19. The polymer composition according to claim 7, wherein the polymeric toughener is a thermoplastic acrylic polymer that is not a copolymer of ethylene.

20. The polymer composition according to claim 19, wherein the thermoplastic acrylic polymer has a core-shell structure.

21. The polymer composition according to claim 7, wherein the polymeric toughener is present in an amount between about 0.5 to about 15 wt % based on the weight of the polymer composition.

* * * * *